Oct. 11, 1966  R. R. DILLON  3,277,705
DYNAMOMETER
Filed Jan. 6, 1964

INVENTOR
RALPH R. DILLON
BY
Elliott & Pastoriza
ATTORNEYS

United States Patent Office 3,277,705
Patented Oct. 11, 1966

3,277,705
DYNAMOMETER
Ralph R. Dillon, Van Nuys, Calif., assignor to W. C. Dillon & Company, a corporation of California
Filed Jan. 6, 1964, Ser. No. 335,719
2 Claims. (Cl. 73—141)

This invention generally relates to dynamometers and more particularly to the type of dynamometer employed in measuring or sensing exerted tensile or compressive forces.

Certain fundamental parts of the dynamometer of the present invention are conventional and are disclosed and described in Patent No. 2,287,299, for example, which issued June 25, 1942 under the title Dynamometer. The present invention relates to the same type of bar structure which embodies openings in its opposite end portions for coupling to exerted forces. In response to exerted tensile or compressive forces, the bar tends to bow or flex in one direction or the other (relative to its longitudinal axis). In turn, the bowing movement or flexure may be measured by particular measuring means which will yield an indication of the force being exerted.

Over the years, certain variations have been made in the particular type of measuring means employed in conjunction with this type of force bar, for example, as shown in Patent No. 2,963,904, issued December 13, 1960, under the title Dynamometer by the patentee, William C. Dillon, Sr.

As will be evident from a reading of the aforementioned patents, certain problems have existed with respect to this type of dynamometer construction. For the most part, these problems have related to minimizing the number of parts used for the purpose of economical production, and yet at the same time, achieving substantial linearity between the indicating means used and the incremental deflection of the bar in order to maintain accuracy throughout a wide range of loads. In this latter regard, it is to be noted that an inherent characteristic of this type of force bar is that the bar tends to strain or flex to a greater degree in response to initial force loads up to a given point in its capacity, and thereafter the movement of the bar decreases somewhat in proportion to further increases in the exerted force.

As a consequence, it has been necessary to devise some type of means which will sense and yet compensate for this variation in flexure or straining movement of the bar so that the indicating means or dial and pointer members, for example, associated with the dynamometer, will yield an accurate measurement of the exerted force without the necessity of a specially designed dial for each dynamometer made.

With the foregoing in mind, it is a primary object of the present invention to provide an improved dynamometer which employs a minimum number of parts, and yet which will yield linear readings proportional to the exerted force imposed such that it is susceptible of a high degree of accuracy with only minor adjustments of mass-produced parts. In this regard, it is also an object of the present invention, to provide a dynamometer conforming with the aforegoing which is also susceptible of simple adjustment to accommodate a wide capacity of loads.

Another object of the present invention is to provide a dynamometer for measuring exerted forces which is simple and rugged in its construction, and which inherently embodies a construction preventing damage to the dynamometer in the event the exerted load is suddenly relieved or substantially decreased such that the parts unexpectedly recoil to their normal positions.

A still further object of the present invention is to provide a dynamometer for measuring exerted forces which may be readily adjusted to compensate for manufacturing tolerances.

A still further object of the present invention is to provide a dynamometer for measuring exerted forces which may be conveniently maintained and used, and which may be readily recalibrated by the user in the field, if necessary.

These and other objects and advantages of the present invention are generally achieved by providing an improved dynamometer embodying integral angularly disposed portions. The angularly disposed portions are designed for coupling to means for applying force thereto for effecting a degree of flexure of the bar according to the amount of load applied.

In accordance with a preferred embodiment of the present invention, a first arm member has one end rigidly secured proximate one end of the bar such that it has its free end extending toward the opposite end of the bar. A second arm member is rigidly secured to the opposite end of the bar such that it has its free end extending towards said one end of the bar. In consequence of this type of construction, the free ends of the respective arms will move through arcs, in response to exerted forces applied to the pressure bar, proportional to their respective distances from the ends of the bar. Thus, a differential movement between such free ends is achieved by providing each arm with a different length.

A gauge movement means is coupled to the first arm. Also, a pressure lever member is carried on the first arm and pivoted at a given point near the free end thereof. The pressure level member includes a first portion on one side of the pivot point co-functioning with the gauge movement means and another portion on the other side of the pivot point.

In accordance with a feature of the present invention, an adjustable stop or limit member is mounted on the second arm and limits movement of the other lever portion of the pressure lever in a given direction thereof. Spring means are also coupled to the pressure arm and to the second arm member so as to bias the pressure arm into engagement with the stop member.

With such a construction, in response to differential movement caused, for example, by the first arm moving further than the second arm, the pressure lever will tend to rotate about its pivot point according to the greater degree of movement imparted to the first arm in response to flexure of the bar. The stop means on the second arm will tend to limit this movement according to adjustment of the stop member while the spring means tends to assure that the pressure lever is always biased to a given position such that the movement will be transferred to the pressure arm. The pressure lever then translates the movement to the gauge movement means (through the first portion thereof heretofore mentioned). The gauge movement does not form a part of the present invention except in combination with other components herein mentioned.

A better understanding of the present invention will be had by reference to the drawings, showing merely one illustrative embodiment, and in which.

Figures 3, 4:
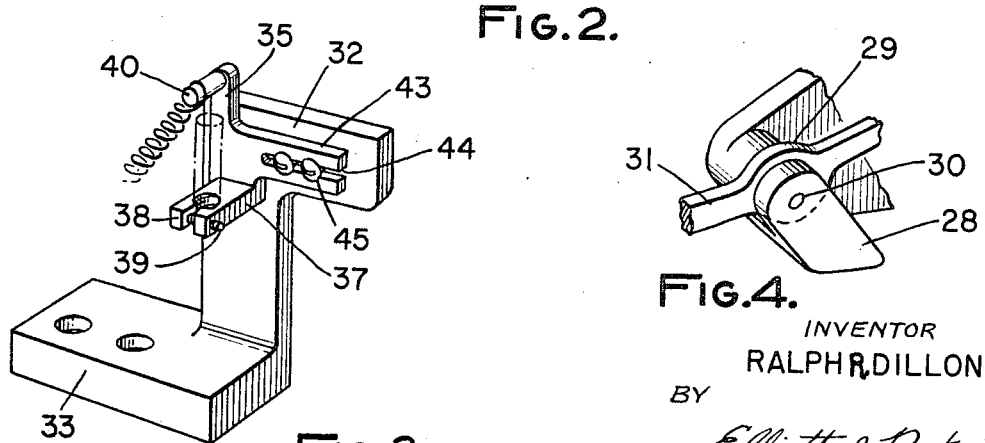
FIGURE 3 is a somewhat enlarged isometric view of a support member or post attachment shown on the left hand part of the pressure bar as viewed in FIGURE 1 which is at times referred to as the "second arm member"

FIGURE 4 is an enlarged isometric view of the pivot connection of the pressure lever to the first arm member or backing plate.

Figure 1:
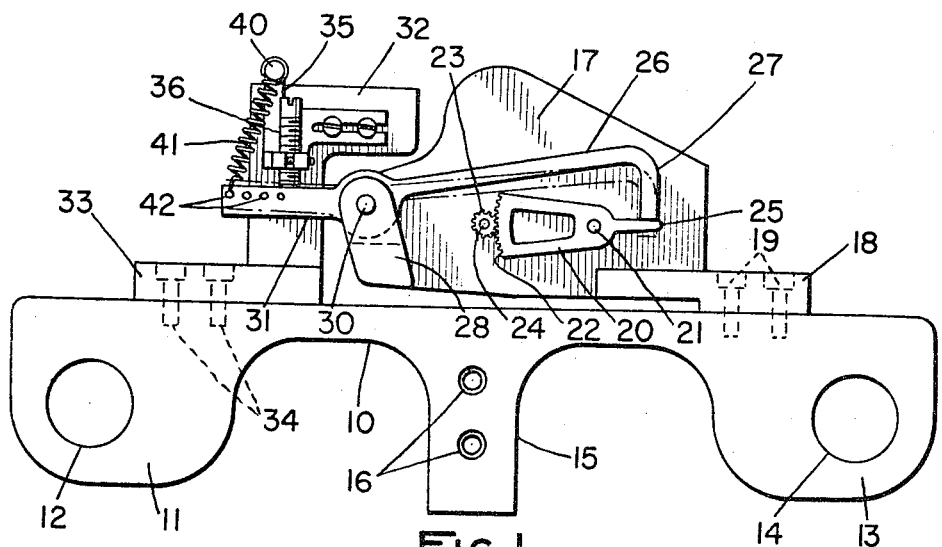
FIGURE 1 is a front elevation of a dynamometer according to the present invention with only the inner workings of the dynamometer being shown for the sake of clarity.

Referring now to the drawings, there is shown in FIGURE 1 a dynamometer according to the present invention, including a pressure bar 10 similar to the force bar shown, for example, in Patent Nos. 2,287,299 and 2,963,904. The bar 10 is provided at one end with an angularly disposed portion 11 having an aperture 12 therein and at its other end with an angularly disposed portion 13 having an aperture 14 therein. The angularly disposed portions 11 and 13 are provided with the openings 12 and 14 for coupling to exerted forces in the manner, for example, as described in Patent No. 2,287,299. The bar structure as such does not form a part of the present invention except insofar as it co-functions with the remainder of the dynamometer in the combinations set forth.

The bar 10 is provided with an intermediate portion 15, which may have apertures 16 therein for coupling to a case structure or the like.

As shown in FIGURE 1, the bar 10 has coupled thereto a first arm member or backing plate 17 which has one end portion thereof 18 attached through screws 19 near the angularly disposed end portion 13. Of course, the backing plate 17 may be secured in any suitable manner to the bar 10, the screws 19 merely illustrating one form of attachment. Coupled to the back plate 17 is a gear sector rack 20 which is pivoted to the plate at 21. The rack 20 is provided with gear teeth 22 which are designed to engage a pinion member 23 which may be pivoted at 24 to the plate 17. The pivot member 24 may have coupled thereto a pointer (not shown) which is designed to co-function with a dial indicator in the manner, for example, as disclosed in Patent No. 2,287,299.

The gear sector rack 20 has a lever portion 25 to the right of the pivot member 21, as viewed in FIGURE 1, which is designed to be engaged by a pressure lever 26 and more particularly, a downwardly depending portion 27 thereof.

The pressure lever 26 is pivotally coupled in a yoke 28 which may be integrally cast as a part of the backing plate 17. The yoke 28, as more clearly shown in the view of FIGURE 4, includes a slot 29 through which extends a pivot member 30. The pressure lever 26 has a projecting portion 31 extending to the left of the pivot member 30 as clearly seen in the views of FIGURES 1 and 4.

A support member 32 functions as a second arm member coupled to the pressure bar 10. The member 32 as clearly shown in the view of FIGURE 3, includes a base portion 33 which may be attached as with screws 34 to or near the end portion 11 of the pressure bar 10.

The member 32 has connected thereto an adjustment screw retainer 35 which functions to receive an adjustment screw 36. For this purpose, a mounting lug 37 extends outwardly from the retainer 35 and the adjustment screw is designed to be threaded therein within the split end portion 38. If desired, a locking screw 39 may be provided to lock the adjustment screw 36 in a given vertical position within the lug portion 37.

The adjustment screw retainer 35 may also function as a means of retaining one end of a biasing spring 41 (shown in FIGURES 1 and 3) which has its other end coupled to the portion 31 of the pressure lever 26. For adjustment purposes, a plurality of apertures 42 may be provided in the portion 31 of the pressure lever 26 for increasing or decreasing the tension of the spring 41 on this end of the pressure bar.

Of course, it is also possible to provide the spring member 41 in other locations, for example, by attaching it to the backing plate 17 in a manner such that it exerts a downward biasing force on the portion 27, for example, of the pressure lever 26 which would create a similar effect to the upward biasing force on the portion 31 as shown herein for purposes of illustration.

For adjusting the position of the adjustment screw 36 relative to the pressure lever 26, it is desirable to provide some means of lateral movement of the adjustment screw retainer 35. In the illustrative embodiment shown, this means comprises providing an arm portion 43 as part of the adjustment screw retainer 35 which has embodied therein a slot 44 to receive screws 45. With such a construction, the adjustment screw retainer 35 may be moved sideways back and forth to in turn vary the position of the adjustment screw 36 relative to the portion 31 of the pressure lever 26.

The operation of the improved dynamometer of the present invention may now be described.

Figure 2:
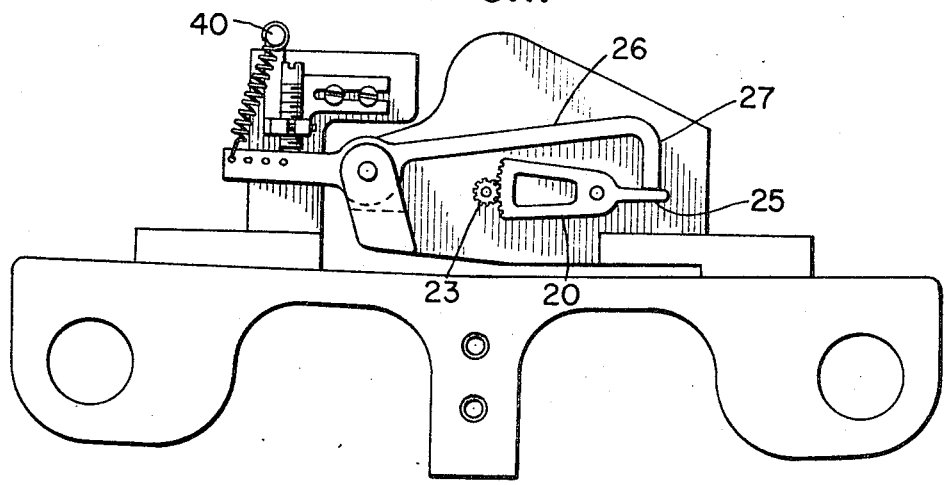
FIGURE 2 is another view of the dynamometer of FIGURE 1, the pressure bar thereof being shown in a somewhat exaggerated position it will assume in response to exerted forces being applied to its opposite angularly disposed portions.

Although the improved dynamometer will function with either tensile or compressive loads being applied to the angularly disposed portions 11 and 13 of the pressure bar 10, for purposes of description, the dynamometer will be considered as having a tensile load applied thereto with the result that it will tend to flex or bow as illustratively shown in FIGURE 2.

At such time as the tensile force is applied, and the bowing action occurs as in FIGURE 2, it will be apparent that the free end of the back plate 17 and the connected pressure lever 26 will tend to move downwardly along an arcuate path a greater distance than the adjustment screw 36 coupled to the retainer structure 32. In other words, since the pivot member 30 supporting the pressure lever 26 is spaced a considerable distance from the point of attachment of the backing plate 17 through the base member 18 to the pressure bar 10, the movement of the base member 18 will be multiplied as the lever arm increases therefrom towards the pivot point 30. Since the pressure lever 26 and the portion 31, in particular thereof, will move further than the adjustment screw 36, the spring member 41 will necessarily cause a slight movement of the portion 31 upwardly in order to bring this portion again into contacting engagement with the adjustment screw 36. This movement will, in turn, effect a downward movement of the depending arm portion 27 to engage the portion 25 of the gear sector rack 20 and cause rotation of the pinion 23 to which the dial indicator pointer may be attached.

Normally with this type of pressure bar unit, as the bar is expanded or strained to bow in the manner as shown in FIGURE 2, the initial load or force applied to the portions 11 and 13 will effect a greater strain or bowing than the further increments of force that may be applied. In consequence, any direct or responsive indication of the incremental bowing action taking place will be non-linear unless some type compensation means is employed. It has been found with the construction of the present invention that proper positioning of the adjustment screw 36 relative to the portion 31 of the pressure lever 26 will cause linearity within one-half of one percent (½ of 1%) accuracy of the total capacity of the unit. Thus, within the limits of the dynamometer, as the load increases, the adjustment screw 36 will tend to move slightly inwardly relative to the pivot point 30 of the portion 31 of the pressure lever 26. This movement is sufficient to compensate for the non-linearity that would otherwise occur.

The capacity of the dynamometer may be very easily varied by loosening the screws 45 in the slot 44 of the adjustment screw retainer 35 to move the retainer back and forth a limited amount thereby changing the position of the adjustment screw in its point of contact with the pressure lever portion 31, in the manner heretofore indicated. Also, for precise adjustment of the dynamometer, the adjustment screw may be threaded upwardly and downwardly in the projecting lug 37 by loosening the locking screw 39 and resetting same when the proper point of vertical adjustment has been achieved.

With the foregoing adjustments, it is found it is not necessary to make any other changes in the dynamometer and a standard linear type dial may be used for indicating the exerted force.

Also, it will be evident from the drawings that in the event an exerted force being applied to the dynamometer pressure bar 10 is suddenly released, for example, as a result of specimen breakage, no dangerous impact will occur to the parts. Thus, in the event of a sudden release of load, the backing plate 17 and coupled pressure lever 26 will tend to move in a direction such that the portion 31 of the pressure lever 26 will be moving away from the adjustment screw 36 at the same time that the adjustment screw is moving in a direction away from the portion 31. Thus, if the backing plate 17 be considered the first arm member and the post 32 the second arm member, these arm members will be moving apart instead of together whereby impact from sudden contact or recoil is avoided. Furthermore, it will be noted that the backing plate 17 and coupled pressure lever 26 have substantially more inertia than the post 32 and the members coupled thereto. In consequence, the backing plate 17 will tend to move somewhat slower than the post 32 such that the portion 31 of the pressure lever 26 will tend to maintain its contact with the adjustment screw 36 without impacting same.

From the foregoing, it will be seen that the improved dynamometer of the present invention not only yields a simplified, rugged construction embodying a minimum number of parts, but also enables a construction wherein linearity may be obtained with a high degree of accuracy. Furthermore, the improved dynamometer construction of the present invention prevents any damage to the parts as a result of recoil or repositioning by the sudden return of the moving parts thereof to normal positions upon unexpected release of load.

Although the invention has been described in a preferred embodiment, it will be appreciated that many modifications and changes may be made without departing from the basic spirit and scope of the invention as set forth in the following claims.

What is claimed is:

1. An improved dynamometer comprising, in combination: a pressure bar having integral angularly disposed portions; means for applying force to the angularly disposed portions for effecting flexure of the bar according to the force applied; a first arm member secured to said bar proximate one end thereof; a second arm member secured to said bar proximate the other end thereof; a gauge movement means mounted on said first arm member; a pressure lever member pivotably coupled to said first arm member, said pressure lever member having a first lever portion on one side of the pivot point thereof and a second lever portion on the other side of the pivot point thereof; a stop member coupled to said second arm member positioned to engage said first lever portion; said stop member and said pressure lever member being, respectively, connected to said second arm member and said first arm member at such points as to create a differential movement between said stop member and said pivot point of said pressure lever member in response to flexure of said bar, such that said pressure lever member will move a greater distance than said stop member, said stop member being susceptible of adjustment lengthwise with respect to said pressure bar such that said stop member may be positioned to engage different points of said first lever portion and thereby vary the capacity of said dynamometer; biasing means retaining said first lever portion of said pressure lever in engagement with said stop means so as to cause said first lever portion of said pressure lever member to move with said stop means relative to said pivot point and thereby effect opposite movement of said second lever portion; and, gauge means connected to said first arm member and coupled for actuation by said second lever portion.

2. An improved dynamometer, according to claim 1, and a pinion means for driving a pointer associated with said gauge means, and in which said stop member is adjustable in a vertical direction relative to said pressure bar to enable resetting of the zero position of said pointer by rotation of said pinion means.

References Cited by the Examiner
UNITED STATES PATENTS

| | | | |
|---|---|---|---|
| 1,724,993 | 8/1929 | Coker | 73—141 X |
| 2,112,252 | 3/1938 | Sang | 73—141 |
| 2,287,299 | 6/1942 | Dillon | 73—141 |
| 2,963,904 | 12/1960 | Dillon | 73—141 |

RICHARD C. QUEISSER, *Primary Examiner.*

C. A. RUEHL, *Assistant Examiner.*